(12) United States Patent
Springmann

(10) Patent No.: US 6,230,859 B1
(45) Date of Patent: May 15, 2001

(54) CABLE ASSEMBLY HOLDER FOR AN INDUSTRIAL ROBOT

(75) Inventor: Stefan Springmann, Hallstahammar (SE)

(73) Assignee: Asea Brown Boveri AB, Vasteras (SE)

( * ) Notice: Subject to any disclaimer, the term of this patent is extended or adjusted under 35 U.S.C. 154(b) by 0 days.

(21) Appl. No.: 09/269,065

(22) PCT Filed: Oct. 14, 1997

(86) PCT No.: PCT/SE97/01711

§ 371 Date: Jun. 10, 1999

§ 102(e) Date: Jun. 10, 1999

(87) PCT Pub. No.: WO98/19090

PCT Pub. Date: May 7, 1998

(30) Foreign Application Priority Data

Oct. 14, 1996 (SE) .................................................. 9603800

(51) Int. Cl.⁷ ...................................................... F16L 3/00
(52) U.S. Cl. ........................................................ 191/12 R
(58) Field of Search ............................ 191/12 R, 12.2 R, 191/12.4; 248/610, 62, 63, 58, 56; 44/681, 682, 918; 901/49, 50, 23

(56) References Cited

U.S. PATENT DOCUMENTS

| 3,227,802 | * | 1/1966 | Pressley | 191/12 R |
| 3,373,954 | * | 3/1968 | Hilsinger | 191/12 R |
| 5,181,591 | | 1/1993 | Zona et al. | 191/12 R |

FOREIGN PATENT DOCUMENTS

| 0 144 602 | of 1985 | (EP) . |
| 434859 | of 1935 | (GB) . |

* cited by examiner

*Primary Examiner*—Mark T. Le
(74) *Attorney, Agent, or Firm*—Connolly Bove Lodge & Hutz, LLP

(57) ABSTRACT

A device for holding and guiding a cable assembly (11) between a first manipulator part (2) and a second manipulator part (3), which is movable in relation to the first part. The device comprises a cable assembly carrier (17) which is attached to the first manipulator part and which is elongated and tubular and that the cable assembly runs longitudinally through the cable assembly carrier. From an initial position, the movement of the cable assembly is influenced by a returning force.

6 Claims, 1 Drawing Sheet

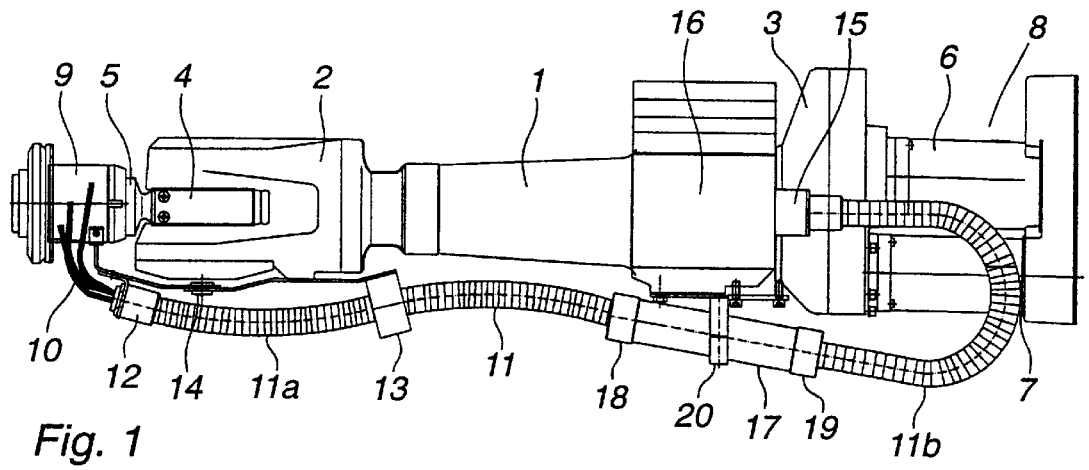
Fig. 1
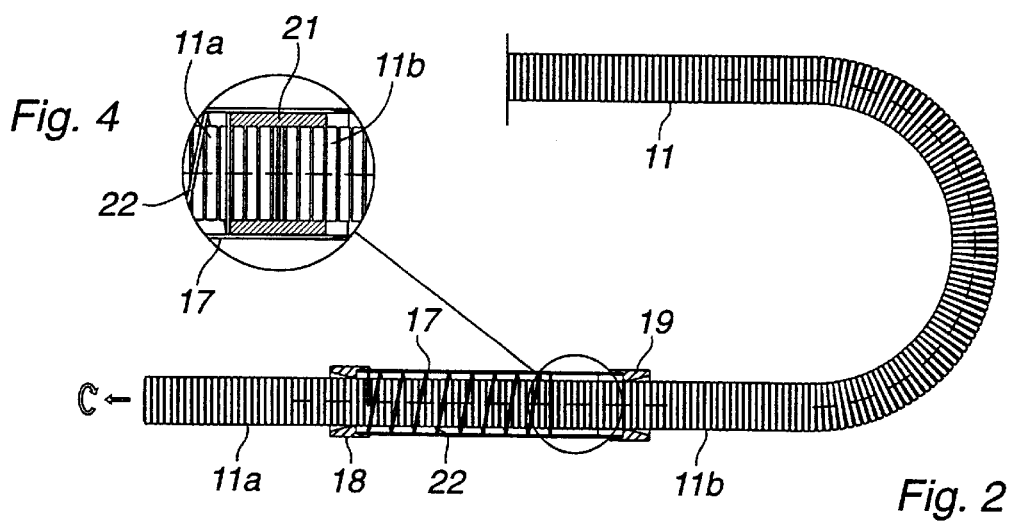
Fig. 4
Fig. 2
Fig. 5
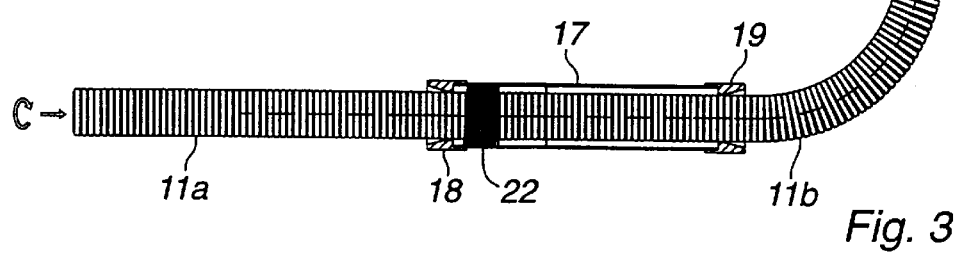
Fig. 3

CABLE ASSEMBLY HOLDER FOR AN INDUSTRIAL ROBOT

TECHNICAL FIELD

The present invention relates to a device for holding and guiding a cable assembly, arranged at a manipulator, according to the type described hereinafter.

BACKGROUND ART

It is common that the tools which are supported by an industrial robot have to be supplied with energy, pressure medium, coolant, etc. This supply takes place via a plurality of connections, which may be formed as electric cables, hoses, pressure tubes or the like. In manipulators there is a general need of ensuring the supply to the tool during all the movements of the manipulator for a long period of time.

From EP 0 144 602, an industrial robot is previously known, in which the supply connections to the tool are drawn from a fixed external point in a freely suspended loop to the stand of the manipulator. From the stand, a bundle of connections run to the tool through holders fixed to the arms of the manipulator. The bundle of connections is arranged to run in loops between the holders, whereby the loops ensure that the bundle of connections may follow all the movements of the manipulator. The bundle of connections is thus subjected to a great number of bendings in various directions and with different radii of bending. These unfavorable bendings successively lead to fatigue breakdown, ultimately resulting in rupture of the connections.

A special problem arises when the connections, which are usually joined into a bundle or surrounded by a protective hose, are to be brought to run in parallel with, thus conforming to, a longitudinally rotatable robot arm. In such contexts it is common for the arm to be able to rotate, from an initial position, more than half a turn in both directions. The bundle of connections must thus run along the envelope surface of the robot arm. When the arm is in its neutral position, the necessary length is equal to the length of the arm. When rotating half a turn, however, the necessary length increases. The increase corresponds to the fact that the bundle of connections, during rotation, must be laid half a turn around the envelope surface of the robot arm. This distance constitutes half the circumference of a circle with a radius defined by the distance between the axis of rotation and the center of the bundle of connections. Calculation using the Pythagorean theorem shows that the necessary length of the bundle of connections is between 20 and 50% longer than the arm itself. During rotation of the robot arm, the bundle of connections is also subjected to a rotation around its own axis.

A common way of compensating for the length of the bundle of connections necessary for the rotation is to allow the bundle to run through two holders between which the bundle of connections extends in a loop. One holder is then fixed to the rotatable robot arm whereas the other holder is fixed to the bearing housing, in which the robot arm is journalled. The above-mentioned problem with fatigue breakdown exists also in this case. Another problem with the described embodiment is that the loop reduces the mobility of the robot and that there is a risk that the loop gets stuck somewhere, or is quite simply cut off.

SUMMARY OF THE INVENTION

The object of the present invention is to achieve a device for holding and guiding a bundle of connections of the kind described above so as to avoid loops and so as to counteract damage due to fatigue. The device shall be simple and cost-effective and allow the bundle of connections to be passed, with a minimum of space requirement, from an attachment at a bearing housing of a longitudinally journalled rotary body to an attachment of the rotary body itself.

This is achieved by a device disclosed herein. The device is especially intended for attachment of a cable assembly or bundle of connections between a bearing housing and a longitudinally journalled robot arm and an attachment in the arm itself. The device is of such a nature that it exerts a tensile force on the cable assembly in the longitudinal direction of the cable assembly so as to counteract slack during the movements of the robot. For this purpose, the cable assembly is attached to the movable robot arm and a spring force applied to the cable assembly on a level with the attachment of the robot arm in the bearing housing. The cable assembly runs through a cable assembly carrier, which includes a spring and which controls the cable assembly when the arm is moving such that no slack arises and such that the cable assembly is wound up on the envelope surface of the robot arm during rotation of the arm.

BRIEF DESCRIPTION OF THE DRAWINGS

The invention will be explained in greater detail by description of an embodiment with reference to the accompanying drawing, wherein FIG. 1 shows a view of an upper robot arm with a device for holding and guiding a cable assembly including electric cables and hoses according to the invention, FIG.2 shows a cable assembly, enclosed in a protective hose, and a cable assembly carrier with a relaxed spring, FIG. 3 shows a cable assembly, enclosed in a protective hose, and a cable assembly carrier with a spring tensioned against the movements of the cable assembly, FIG. 4 shows a detail of the cable assembly carrier, and FIG. 5 shows a tensile stress-relieving device intended for the cable assembly and mounted at the end of the protective hose.

DESCRIPTION OF THE PREFERRED EMBODIMENT

An upper arm 1 with an outer hand 2 for a manipulator (not shown) is shown in FIG. 1. The arm 1 is rotatable around an axis in its own longitudinal direction and journalled in a bearing housing 3. The hand comprises a tilt housing 4, which is rotatable around an axis across the axis of the upper arm, and a rotating disc 5, which is rotatable around an axis across the axis of the tilt housing. At that side of the bearing housing which is opposite to the arm, drive means 6, 7, 8 are arranged for the movements of the arm, the tilt housing and the rotating disc. To the rotating disc a tool 9 is mounted, which is supplied with electric power and other working media via a cable assembly 10 including electric cables and hoses. The cable assembly is enclosed in a protective hose 11 of a stiff but flexible material.

The front part 11a of the protective hose is fixed to the hand by means of a fixing device 12 and is guided by a holder 13. The fixing device and the holder are fixed to the hand by means of a common attachment 14. The rear end 11b of the protective hose is fixed, by means of a fixing device 15, to a connection box 16 attached to the bearing housing 3. Between the fixing device 15 and the holder 13, the protective hose runs through a cable assembly carrier 17. The cable assembly carrier comprises a tubular sleeve with a front socket 18 and a rear socket 19 and is fixed to the bearing housing 3 with a fixing device 20. The length of the cable assembly carrier is adapted to contain the longitudinal movements of the cable assembly carrier 11 during rotation of the arm 1 and the socket at each end of the cable assembly carrier is intended to pass the cable assembly through the cable assembly carrier in a frictionless manner.

Embodiments showing the principle of the protective housing and the cable assembly carrier are shown in FIGS. 3, 4 and 5. The protective hose 11 runs through the cable assembly carrier 17, which is shown in cross section. The protective hose is made of a stiff material with a corrugated profile, suitably of plastic. Through this design, the hose is provided with given a number of grooves which cause the hose to allow bending but does not allow compression of the hose. On the protective hose there is applied a hose carrier 21, which runs inside the cable assembly carrier. Between the front socket 18 and the hose carrier, a spiral spring 22 is arranged, which moves freely in space between the protective hose 11 and the inside of the cable assembly carrier 17. The spiral spring exerts a force on the hose carrier, which thus causes the protective hose to be kept stretched between the holder 13 and the cable assembly carrier 17.

When the arm 1 rotates, the protective hose is wound up on the envelope surface of the arm, whereby a necessary length of the protective hose is allowed to be pulled out of the cable assembly carrier, while the spring is being tensioned. FIG. 3 shows how the spring is tensioned when the protective hose has been pulled out maximally in a direction towards the arm. The only loop which arises during the movements of the arm is placed behind the cable assembly carrier. Here, the cable assembly does not encroach upon the mobility of the robot and may, in addition, be given a defined radius of bending which does not result in fatigue breakdown of the cable assembly.

When the protective hose is wound up on the envelope surface of the rotating arm, also the hose is subjected to a forced rotary movement. If this rotation has to be absorbed and stored in the hose, it may lead to uncontrolled bending of the hose. For this reason, the protective hose according to the invention is divided and joined together in the hose carrier. FIG. 4 shows how the front hose part 11a and the rear hose part 11b are joined together in the hose carrier 21. For this purpose, the hose carrier is made in two halves with slots so that the grooves of the protective hose may fit therein. The two halves of the hose carrier are joined together with a screw joint such that the hose parts 11a and 11b may freely rotate independently of each other.

The cable assembly enclosed in the protective hose is, at either end of the protective hose, fixed to a tensile stress-relieving device 23 shown in FIG. 5. The tensile stress relieving device, which is made of an elastic material with good friction, is provided with annular recesses 24. The different parts included in the cable assembly are fitted through the holes to the tensile stress-relieving device, which is thereafter tightened with a circumference-reducing clamping device applied around the tensile stress-relieving device.

Although it is advantageous, the described device is not limited to comprise a cable assembly enclosed in a protective hose, but the cable assembly carrier and the accompanying hose carrier may be arranged directly on the cable assembly. Nor is the cable assembly carrier limited to being straight or made of a stiff material. It may advantageously also be tubular or bent, and also be made of a flexible material.

What is claimed is:

1. A device for holding and guiding a cable assembly between a first manipulator part and a second manipulator part, said second part being movable in relation to the first part, comprising a cable assembly carrier attachable to the first manipulator part, wherein the cable assembly carrier comprises a tube for guiding the cable assembly freely through the carrier, and a force member house completely within and having a common axis with said carrier, for exerting a force on the cable assembly to position said cable assembly at an initial position.

2. A device according to claim 1, wherein the cable assembly is surrounded by a protective hose.

3. A device according to claim 1, said cable assembly carrier further comprising a hose carrier fixable to said cable assembly.

4. A device according to claim 3, the assembly carrier further comprising a front socket and a rear socket for guiding the cable assembly.

5. A device according to claim 4, said force member comprising a spiral spring arranged between said front socket and hose carrier.

6. A method for holding and guiding a cable assembly between a first manipulator part and a second manipulator part movable in relation to the first part, comprising the steps of:

providing a tubular cable assembly carrier;

arranging said cable assembly to run freely through said carrier between said first and second manipulator parts; and providing a force member a house completely within and having a common axis with said carrier for exerting a force on said cable assembly to return it to an initial position.

* * * * *